United States Patent [19]

Kakuda et al.

[11] Patent Number: 4,618,790
[45] Date of Patent: Oct. 21, 1986

[54] AXIAL AIR GAP MOTOR

[75] Inventors: Yoshitaka Kakuda, Takefu; Norimasa Kondoh, Hirakata, both of Japan

[73] Assignee: Matsushita Electric Industrial Co., Ltd., Kadoma, Japan

[21] Appl. No.: 765,197

[22] Filed: Aug. 13, 1985

[30] Foreign Application Priority Data

Aug. 16, 1984 [JP] Japan ................... 59-170640
Aug. 16, 1984 [JP] Japan ................... 59-170641

[51] Int. Cl.⁴ ............................................. H02K 5/16
[52] U.S. Cl. ................................. 310/90; 510/268
[58] Field of Search ............................. 310/90, 268

[56] References Cited

U.S. PATENT DOCUMENTS 3,284,650 11/1966 Franz .................................. 310/90
3,515,918 6/1970 Otto .................................... 310/90
3,999,092 12/1976 Whiteley .................... 310/268 X Primary Examiner—F. Donovan Duggan
Attorney, Agent, or Firm—Wenderoth, Lind & Ponack

[57] ABSTRACT

An axial air gap motor comprising a planar armature, a bracket having a permanent magnet opposed to the armature through an axial air gap, the bracket being formed with a bearing holding portion of cantilever support construction, and oil return members disposed on opposite sides of a sleeve bearing which is supported by the bearing holding portion.

6 Claims, 4 Drawing Figures

AXIAL AIR GAP MOTOR

BACGROUND OF THE INVENTION

The present invention relates to an axial air gap motor suitable for use in general industrial machinery and electrical equipment where high quality and low cost are requirements for the motor and particularly in a field where the motor is subjected to high temperatures and where it is required that the motor have a long service life.

DESCRIPTION OF THE PRIOR ART

This type of conventional motor has a bearing construction which, as shown in FIG. 4, comprises a bracket A31, a bearing housing 32 fixed to said bracket, a sleeve type metal bearing 33 fixed to and substantially covered by said bearing housing, said sleeve type metal bearing 33 being clamped between a thrust washer 34 and a stop ring 37 which is fixed to an armature shaft 36 of an armature 35, thereby holding said shaft. Because of the aforesaid construction, oil which has flowed out of the sleeve type metal bearing 33 is thrown by the thrust washer 34, never to return to the sleeve type bearing, thus offering problems including service life of the sleeve type metal bearing being shortened owing to oil shortage and oil sticking to the commutator surface.

SUMMARY OF THE INVENTION

The present invention, which has radically settled the aforesaid problems, provides an axial air gap motor which is free of the problem of the service life of the bearing being shortened owing to oil shortage, has a long service life and is inexpensive.

According to the present invention, provided at opposite sides of a planar armature are a bracket having a permanent magnet fixed thereto in opposed relation to the planar surface of the armature through an axial air gap, and a magnetic path plate adapted to receive the magnetic flux from said permanent magnet, and said bracket having said permanent magnet fixed thereto is formed with a bearing holding portion of cantilever support construction, opposite sides of said bearing being provided with oil throwers, oil storage members and covers.

DESCRIPTION OF THE PREFERRED EMBODIMENTS

Figure 1:
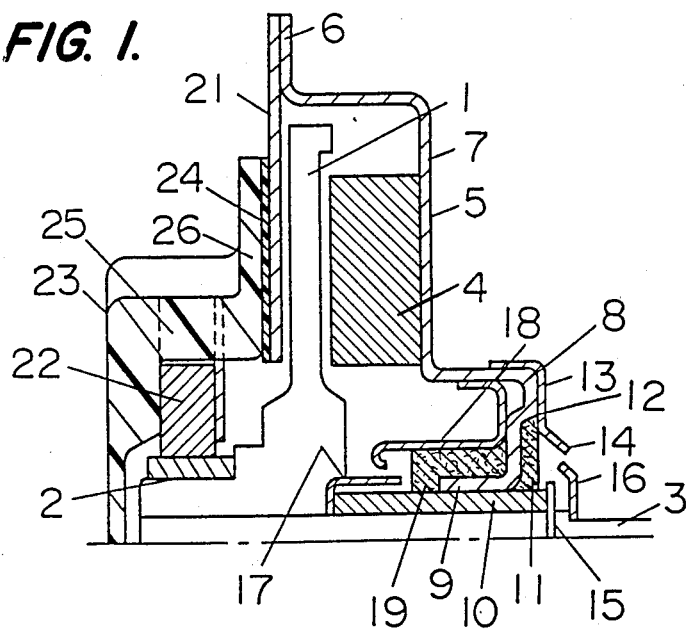
FIG. 1 is a sectional view of an axial air gap motor according to an embodiment of the present invention.

An embodiment of the present invention will now be described with reference to the drawings. In FIG. 1, the numeral 1 denotes a coreless armature having a plurality of coils (not shown) electrically connected to a commutator 2, fabricated in planar form, and made integral with a shaft 3 and with the commutator 2 by using synthetic resin, said armature being fixed to the shaft 3 for rotation as the latter is rotated. Disposed in opposed relation to the planar surface of the armature 1 is an annular permanent magnet 4, which is adhesively secured to the inner surface of a shell-like bracket 5 of magnetic material which covers at least part of said armature 1. The bracket 5 comprises a flange portion 6 disposed in the outermost peripheral region, a planar portion 7 continuous with said flange portion 6 and having said permanent magnet 4 fixed thereto, a cylindrical oil receiving and holding portion 8 continuous with the radially inner side of said planar portion 7 and projecting axially outward, and a bearing holding portion 9 continuous with said oil receiving and holding portion 8 and projecting axially inward, said bearing holding portion 9 having press fitted therein a sleeve bearing 10 for cantilever-wise supporting the shaft 3. The sleeve bearing 10 has its opposite sides exposed outside the bearing holding portion 9, the portion of said sleeve bearing 10 exposed outwardly of the bracket 5 being contacted around its outer periphery with an annular oil storage member 11 of felt impregnated with lubricating oil, said oil storage member 11 being received in a circular recess 12 formed in the axially outer end surface of the oil hqlding portion 8 of the bracket 5. The oil storage member 11 is held in position by an end cover 13 press fitted on the oil holding portion 8, the radially inner side of said end cover 13 being integrally formed with a conical oil receiving flange 14 whose smaller diameter is located on the outer side (right side as viewed in FIG. 1).

The portion of the shaft 3 located outside the bracket 5 has fitted thereon a C-shaped stop ring 15 abutting against the outer end of the sleeve bearing 10 to limit the axial movement of the sleeve bearing 10. The stop ring 10 is formed of an elastic member, elastically engaging an annular groove (not shown) formed in the shaft 3. A dish-shaped oil thrower 16 is located outwardly of the stop ring 15 and inwardly of the oil receiving flange 14 of said end cover 13 so as to centrifugally spatter lubricating oil leaking from the sleeve bearing 10 and allow the oil storage member 11 to recover the spattered oil. In this case, since the oil thrower 16 is positioned inside the oil receiving flange 14 of the end cover 13, the presence of the oil receiving flange 14 prevents lubricating oil from spattering beyond the same and ensures that the lubricating oil leaking along the shaft 3 is recovered by the oil storage member 11 and fed again to the sleeve bearing 10 for lubrication.

Figure 2:
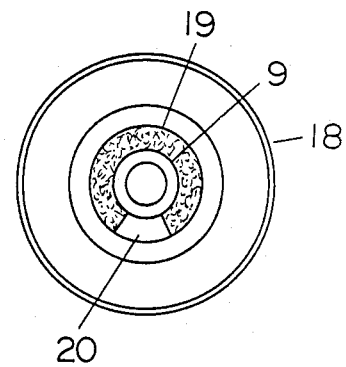
FIG. 2 is a plan view of a bearing cover for the motor of the invention.

A cup-shaped oil thrower 17 is installed to surround the inner end portion of the sleeve bearing 10 disposed inside the bracket 5. The oil thrower 17 is fixed on the shaft 3 between the inner end of the sleeve bearing 10 and the armature 1 and serves to prevent leakage of oil toward the armature. A bearing cover 18 surrounding at least a portion of the oil thrower 17 and the bearing holding portion 9 of the bracket 5 is installed by being press fitted in the oil receiving and holding portion 8 of the bracket 5. Installed in said bearing cover 18 is an oil storage member 10 of felt impregnated with lubricating oil and contacting the portion of the sleeve bearing 10 exposed inside the bearing holding portion 9. The oil storage member 19, as shown in FIG. 2, is formed in its lower region with a notched space 20 serving as an oil reservoir.

In FIG. 1, the numeral 21 denotes a magnetic path plate in the form of a circular plate of magnetic material fixed around its outer periphery to the flange portion 6 of the bracket 5, said magnetic path plate being opposed to that planar surface of the armature 1 which faces away from the permanent magnet 4, with an air gap defined between said magnetic path plate and said planar surface. The magnetic path plate 21 has fixed thereto with a sealant 24 a cover 23 of synthetic resin which holds brushes 22 contacting the commutator 2. The cover 23 is fixed to the magnetic path plate 21 with the sealant 24 in such a manner that its planar portion 26 excluding its regions 25 for receiving the brushes 22 covers the portion of the magnetic path plate 21 opposed to the armature 1. Thus, it is possible to compensate for the strength of the magnetic path plate 21 whose rigidity would be low if not supported and to suppress and absorb vibrations due to the varying energy of the magnetic flux from the armature 1 so as to lower the noise level. In addition, the cover 23 cooperates with the bracket 5 and magnetic path plate 21 to surround the armature 1.

Figure 3:
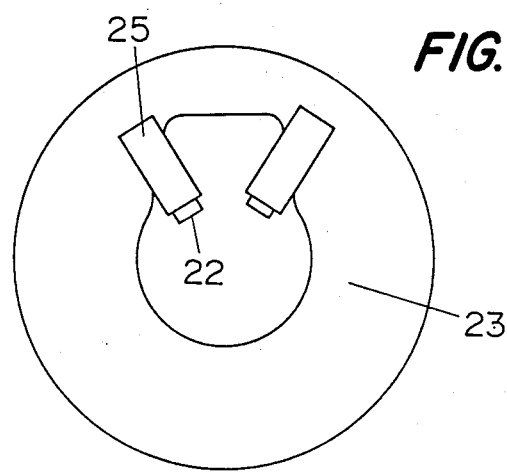
FIG. 3 is a front view of the inner surface of the bearing cover for the motor of the invention.
Figure 4:
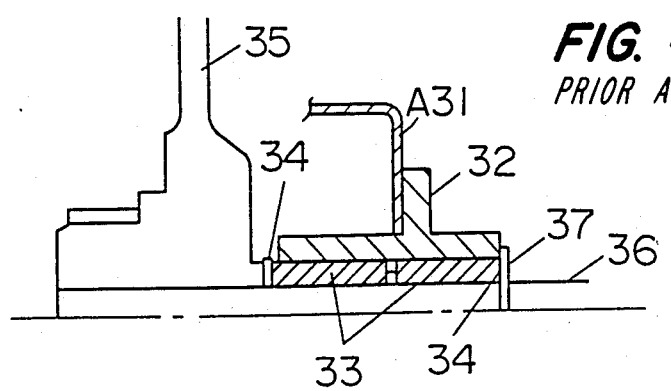
FIG. 4 is a sectional view of the bearing section of a conventional axial air gap motor.

FIG. 3 shows the disposition of the brushes 22 in the cover 23, wherein the brushes 22 are disposed in the brush receiving regions 25 of the cover 23 which are spaced 60 degrees apart from each other.

As has been described so far, according to the present invention, the oil which seeps from the outer periphery of the sleeve bearing 10 is recovered by the oil storage members 11 and 19, while the oil which flows out owing to the heat of friction on the end surfaces of the sleeve bearing is recovered by the oil storage members 11 and 19 by aid of the oil throwers 16 and 17, thereby preventing oil drain. Further, the oil which flows out of the oil storage member 19 under high temperatures from causes including the generation of heat by the motor is temporarily held in the large space 20, where there is no oil storage member 19, under the bearing cover 18, thereby avoiding overflow of oil from the bearing cover 18 and ensuring retention of oil in the sleeve bearing 10. Further, the bearing holding portion 9 is made integral with the bracket 5. Thus, the invention makes it possible to provide an accurate, inexpensive, long life, axial air gap motor.

What is claimed is:

1. An aixal air gap motor comprising a coreless armature having a plurality of coils in planar form set in resin, and fixed on a shaft, a bracket including a permanent magnet opposed to said armature through an axial air gap, a planar portion having said permanent magnet fixed thereto, a cylindrical oil receiving and holding portion continuous with the radially inner side of said planar portion and projecting axially outward, and a cylindrical bearing holding portion continuous with said oil receiving and holding portion and projecting axially inward, a magnetic path plate opposed to that planar surface of the armature which faces away from said permanent magnet, with an air gap defined between said magnetic path plate and said planar surface, said magnetic path plate being fixed around its outer periphery to said bracket, a sleeve bearing fixed to the bearing holding portion of said bracket with its opposite ends exposed outside said bearing holding portion, said sleeve bearing cantilever-wise supporting said shaft for rotation therein, oil storage members positioned on the inner and outer surfaces of said bracket to surround at least a portion of said sleeve bearing and serving to feed lubricating oil to said sleeve bearing, an end cover attached to the outer side of said oil receiving and holding portion and adapted to hold said oil storage member positioned on the outer side of said bracket, a bearing cover attached to the inner side of said oil receiving and holding portion and adapted to hold said oil storage member positioned on the inner side of said bracket, an oil thrower secured to said shaft with its front end positioned inwardly of said end cover, said oil thrower ensuring that lubricating oil leaking from the portion of said sleeve bearing which is exposed outside said bracket is returned to the oil storage member which is positioned on the outer side of said bracket, and a second oil thrower secured to the shaft between the end surface of said sleeve bearing positioned inside said bracket and said armature, the front end of said second oil thrower being positioned between said bearing cover and said sleeve bearing.

2. An axial air gap motor as set forth in claim 1, wherein said oil storage members are formed of felt impregnated with lubricating oil.

3. An axial air gap motor as set forth in claim 1, wherein the oil storage member which is positioned on the outer side of the bracket is in the form of a ring and is received in a recess formed in the axial outer end surface of the oil receiving and holding portion.

4. An axial air gap motor as set forth in claim 1, wherein the end cover has on its radially inner side a conical oil receiving flange whose smaller diameter is located on the outer side.

5. An axial air gap motor as set forth in claim 1, wherein the oil thrower positioned outside the bracket is dish-shaped.

6. An axial air gap motor comprising a coreless armature having a plurality of coils in planar form set in resin, and fixed on a shaft, a commutator which, together with said armature, is fixed on said shaft, a permanent magnet opposed to said armature through an axial air gap, a bracket including a planar portion having said permanent magnet fixed thereto, a cylindrical oil receiving and holding portion continuous with the radially inner side of said planar portion and projecting axially outward, and a cylindrical bearing holding portion continuous with said oil receiving and holding portion and projecting axially inward, a magnetic path plate opposed to that planar surface of the armature which faces away from said permanent magnet, with an air gap defined between said magnetic path plate and said planar surface, said magnetic path plate being fixed around its outer periphery to said bracket, a sleeve bearing fixed to the bearing holding portion of said bracket with its opposed ends exposed outside said bearing holding portion, said sleeve bearing cantilever-wise supporting said shaft for rotation therein, oil storage members positioned on the inner and outer surfaces of said bracket to surround at least a portion of said sleeve bearing and serving to feed lubricating oil to said sleeve bearing, an end cover attached to the outer side of said oil receiving and holding portion and adapted to hold said oil storage member positioned on the outer side of said bracket, a bearing cover attached to the inner side of said oil receiving and holding portion and adapted to hold said oil storage member positioned on the inner side of said bracket, an oil thrower secured to said shaft with its front end positioned inwardly of said end cover, said oil thrower ensuring that lubricating oil leaking from the portion of said sleeve bearing which is exposed outside said bracket is returned to the oil storage member which is positioned on the outer side of said bracket, a second oil thrower secured to the shaft between the end surface of said sleeve bearing positioned inside said bracket and said armature, the front end of said second oil thrower being positioned between said bearing cover and said sleeve bearing, and a cover of synthetic resin having regions on its inner surface for receiving brushes contacting said commutator, said cover being fixed to the magnetic path plate with a sealant in such a manner that its planar portion excluding said brush receiving regions covers the portion of the magnetic path plate opposed to said armature, said cover cooperating with said bracket and said magnetic path plate to surround the armature.

* * * * *